US012760567B2

(12) United States Patent
Jiang et al.

(10) Patent No.: US 12,760,567 B2
(45) Date of Patent: Oct. 13, 2026

(54) VEHICLE DOOR ASSEMBLY AND VEHICLE

(71) Applicant: BYD COMPANY LIMITED, Shenzhen (CN)

(72) Inventors: Xuyao Jiang, Shenzhen (CN); Xiaoqiang Zhang, Shenzhen (CN); Ming Li, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 12 days.

(21) Appl. No.: 18/900,867

(22) Filed: Sep. 29, 2024

(65) Prior Publication Data

US 2025/0020004 A1 Jan. 16, 2025

Related U.S. Application Data

(63) Continuation of application No. PCT/CN2023/087257, filed on Apr. 10, 2023.

(30) Foreign Application Priority Data

May 31, 2022 (CN) ......................... 202210607208.4

(51) Int. Cl.
*E05B 85/10* (2014.01)
*E05B 85/18* (2014.01)

(52) U.S. Cl.
CPC ............ *E05B 85/103* (2013.01); *E05B 85/18* (2013.01)

(58) Field of Classification Search
CPC ............................. E05B 85/103; E05B 85/107
See application file for complete search history.

(56) References Cited

U.S. PATENT DOCUMENTS

| | | | | |
|---|---|---|---|---|
| 9,518,410 | B2 * | 12/2016 | Vasi | E05B 81/08 |
| 9,617,764 | B2 * | 4/2017 | Vasi | E05B 85/103 |
| 10,711,494 | B2 * | 7/2020 | Bingle | E05B 81/06 |

(Continued)

FOREIGN PATENT DOCUMENTS

| | | | |
|---|---|---|---|
| CN | 105247152 | A | 1/2016 |
| CN | 104854289 | B | 10/2017 |

(Continued)

OTHER PUBLICATIONS

The World Intellectual Property Organization (WIPO) International Search Report for PCT/CN2023/087257 Aug. 3, 2023 5 Pages (including translation).

*Primary Examiner* — Carlos Lugo
(74) *Attorney, Agent, or Firm* — Wenye Tan

(57) ABSTRACT

A vehicle, having a vehicle door assembly. The vehicle door assembly includes a vehicle door, an unlocking assembly and a handle assembly. The vehicle door is provided with a handle groove. The unlocking assembly is arranged inside the vehicle door. The handle assembly is arranged in the handle groove. The handle assembly includes a handle and a first pivot shaft. The handle is provided with a retracted position and a position to be unlocked. When the handle is in the retracted position, the handle is located at an opening of the handle groove and does not extend beyond a surface of the vehicle door. When the handle is in the position to be unlocked, the handle is located in the handle groove, and the handle comes into contact with the unlocking assembly.

9 Claims, 6 Drawing Sheets

(56) References Cited

U.S. PATENT DOCUMENTS

| | | | | |
|---|---|---|---|---|
| 11,649,659 | B2 * | 5/2023 | Chen | E05B 85/103<br>292/336.3 |
| 2004/0177478 | A1 | 9/2004 | Louvel | |
| 2016/0208523 | A1 | 7/2016 | Bingle et al. | |

FOREIGN PATENT DOCUMENTS

| | | | | | |
|---|---|---|---|---|---|
| CN | 108343331 | A | | 7/2018 | |
| CN | 109972938 | A | | 7/2019 | |
| CN | 111101785 | A | * | 5/2020 | E05B 85/10 |
| CN | 211950028 | U | | 11/2020 | |
| CN | 213175215 | U | | 5/2021 | |
| CN | 113090142 | A | | 7/2021 | |
| CN | 113756666 | A | | 12/2021 | |
| DE | 29804105 | U1 | * | 7/1999 | E05B 77/34 |
| DE | 102006027474 | A1 | * | 12/2007 | E05B 81/76 |
| DE | 102008029447 | A1 | * | 12/2009 | E05B 81/76 |
| DE | 102013016885 | A1 | * | 6/2014 | E05B 81/76 |
| DE | 202021001685 | U1 | * | 6/2021 | B62D 25/24 |
| EP | 0198766 | A1 | | 10/1986 | |
| EP | 3421701 | A1 | * | 1/2019 | E05B 85/107 |
| JP | S63223276 | A | | 9/1988 | |
| JP | 2019027076 | A | * | 2/2019 | |
| KR | 20090064667 | A | | 6/2009 | |
| WO | WO-2017125653 | A1 | * | 7/2017 | E05B 85/107 |
| WO | WO-2017198917 | A1 | * | 11/2017 | E05B 85/107 |

* cited by examiner

VEHICLE DOOR ASSEMBLY AND VEHICLE

CROSS-REFERENCE TO RELATED APPLICATIONS

The present application is a continuation application of PCT application No. PCT/CN2023/087257, filed on Apr. 10, 2023, which claims priority to Chinese Patent Application No. 202210607208.4, filed on May 31, 2022, and entitled "VEHICLE DOOR ASSEMBLY AND VEHICLE", content of all of which is incorporated herein by reference.

FIELD

The present disclosure relates to the field of vehicle technology, and in particular to a vehicle door assembly and a vehicle.

BACKGROUND

At present, the door handles of most cars are exposed, but as competition in the automobile market continues to intensify, the door handles are gradually developing into hidden door handles.

In the related art, the hidden door handle extends outward to unlock the door when it is necessary to open the door. However, when the vehicle is in a freezing environment, the extension of the door handle is easily hindered, thus affecting the normal unlocking of the door. There are also hidden handles that leave the door handles exposed all the time while the car is driving. This not only increases air resistance, but also easy to make consumers mistakenly believe that the handles are faulty.

SUMMARY

The present disclosure aims to solve at least one of the technical problems existing in the prior art. To this end, the present disclosure provides a vehicle door assembly, which can achieve complete hiding of the handle by rotating the handle toward the inner side of the vehicle door.

The present disclosure further provides a vehicle including the vehicle door assembly.

An embodiment according to a first aspect of the present disclosure provides a vehicle door assembly, including: a vehicle door, the vehicle door is provided with a handle groove; an unlocking assembly, the unlocking assembly is arranged in the vehicle door for unlocking the vehicle door; and a handle assembly, the handle assembly is arranged in the handle groove, the handle assembly includes a handle and a first pivot shaft, the first pivot shaft is pivotally arranged in the handle groove, the handle is arranged on the first pivot shaft, and the handle has a retracted position and an unlocking position; wherein, when the handle is in the retracted position, the handle is located at the opening of the handle groove and does not protrude beyond the surface of the vehicle door; when the handle is in the unlocking position, the handle is located in the handle groove, and the handle is in contact with the unlocking assembly, so as to drive the unlocking assembly to unlock the vehicle door under the action of an external force.

According to the vehicle door assembly in an embodiment of the present disclosure, the handle is rotated inwardly to ensure that the handle is always in a hidden state, which not only can reduce the wind resistance, but also can avoid the trouble that the outward-extending hidden handle cannot be opened in a freezing environment.

An embodiment according to a second aspect of the present disclosure provides a vehicle, including: a vehicle door assembly according to the above embodiment of the first aspect of the present disclosure.

The additional aspects and advantages of the present disclosure are partially provided in the following descriptions, some of which will become apparent from the following descriptions or may be learned from practices of the present disclosure.

BRIEF DESCRIPTION OF THE DRAWINGS

The above and/or additional aspects and advantages of the present disclosure will become apparent and easily understood from the description of the embodiments in conjunction with the following drawings, in which.

Figure 1:
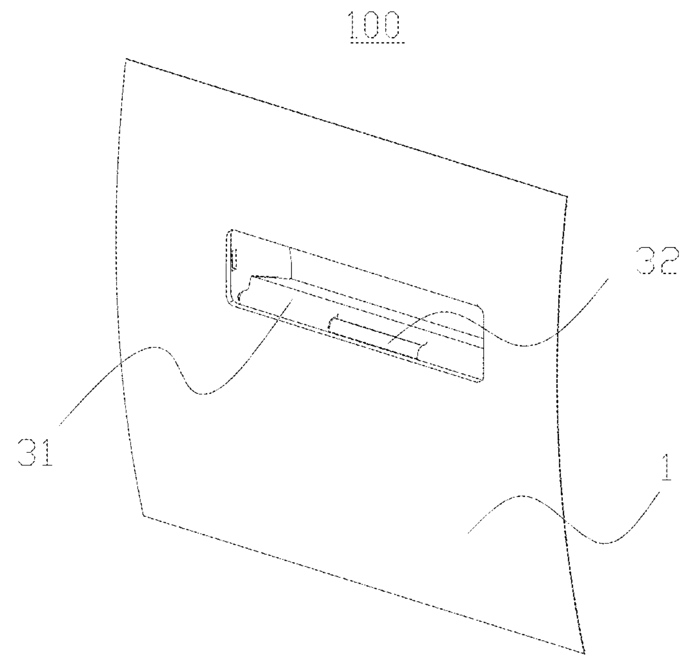
FIG. 1 is a schematic drawing of a vehicle door assembly according to an embodiment of the present disclosure.

Reference numerals: 100. Vehicle door assembly; 1. Vehicle door; 11. Handle groove; 2. Unlocking assembly; 21. Unlocking swing arm; 22. Second pivot shaft; 23. Unlocking fastener; 3. Handle assembly; 31. Handle; 32. First pivot shaft; 4. Power assembly; 5. Driving member; 51. Limiting plate; 6. Transmission device; 61. Transmission member; 611. Driving gear; 612. Driven gear; 62. Rocker arm; 63. Slider; 631. Sliding slot; 632. Mounting groove; 7. Shell; 71. Fixing plate; 8. Locking assembly; 81. Locking block; 82. Puller.

DETAILED DESCRIPTION

The embodiments of the present disclosure are described below in detail. Examples of the embodiments are shown in the accompanying drawings, wherein the same or similar reference numerals in all the accompanying drawings indicate same or similar components or components having same or similar functions. The embodiments described below with reference to the accompanying drawings are exemplary, are intended to explain the present disclosure and cannot be construed as a limitation on the present disclosure.

In the description of the present disclosure, it should be understood that the terms "center", "up", "down", "front", "back", "left", "right", "vertical", "horizontal", "top", "bottom", "inside", "outside", etc., indicating orientations or positional relationships, are based on the orientations or positional relationships shown in the accompanying drawings, and are used merely for the purpose of description and simplifying the description, and shall not be construed as indicating or implying that the referred device or component must have a specific orientation or be constructed and operated in a specific orientation, and therefore cannot be construed as a limitation on the present disclosure.

It should be noted that the terms "first" and "second" are used merely for the purpose of description, and shall not be construed as indicating or implying relative importance or implying a quantity of indicated technical features. Therefore, a feature restricted by "first" or "second" may explicitly indicate or implicitly include at least one of such features. In the descriptions of the present disclosure, unless explicitly specified, "multiple" means at least two, for example, two or three.

A vehicle door assembly 100 that is provided in the embodiment of the present disclosure is described below with reference to FIGS. 1 to 8.

Figure 2:
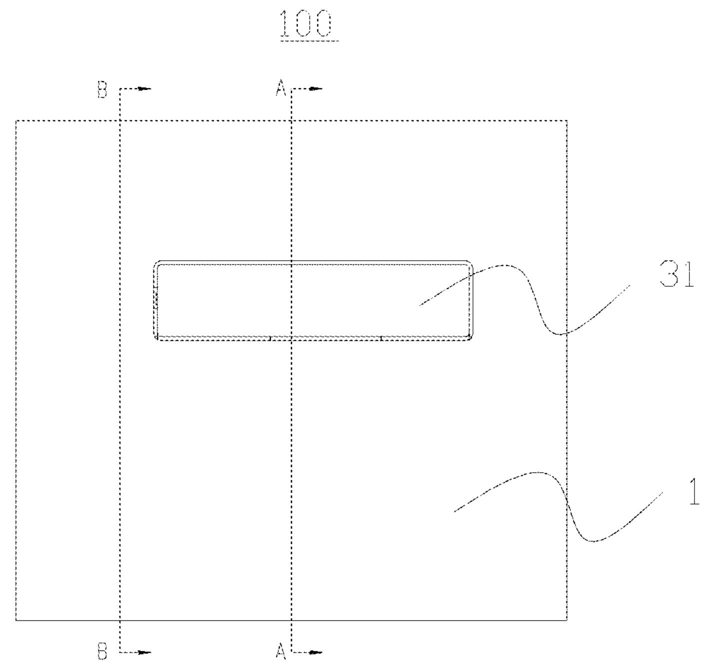
FIG. 2 is a front view of a vehicle door assembly according to an embodiment of the present disclosure.
Figure 3:
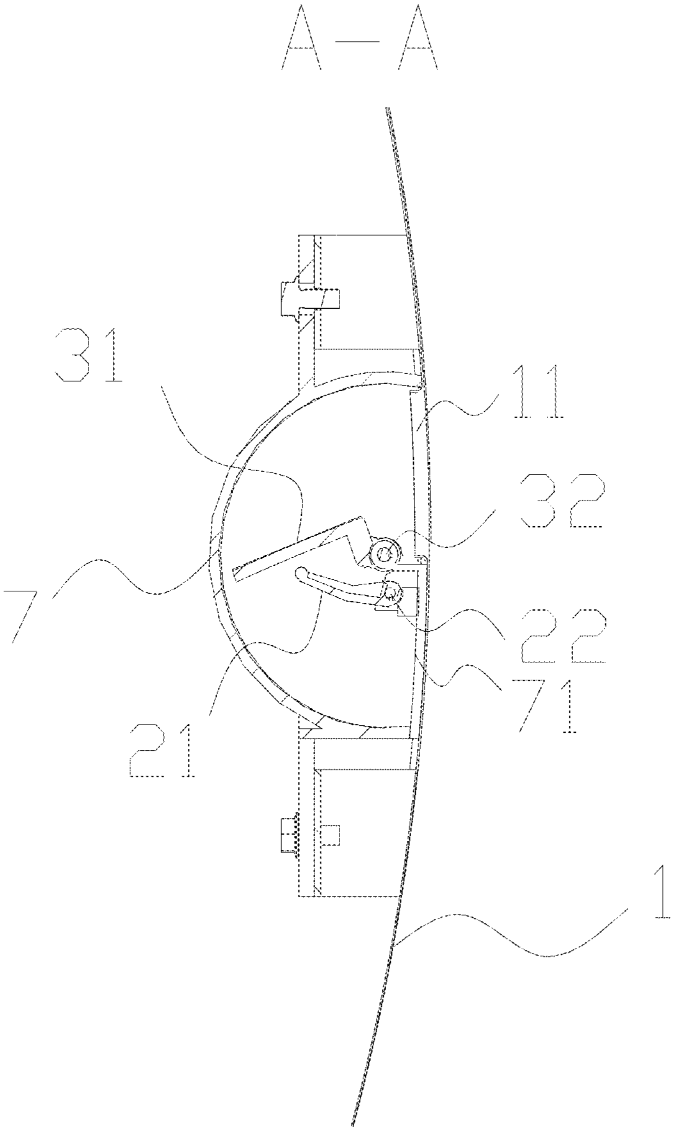
FIG. 3 is a cross-sectional view along line A-A in FIG. 2.

Combined with FIG. 1-FIG. 3, the vehicle door assembly 100 according to an embodiment of the present disclosure includes a vehicle door 1, an unlocking assembly 2, and a handle assembly 3. The unlocking assembly 2 is arranged in the vehicle door 1 to unlock the vehicle door 1. A handle groove 11 is provided in the vehicle door 1, and the handle assembly 3 is arranged in the handle groove 11. The handle assembly 3 includes a handle 31 and a first pivot shaft 32. The first pivot shaft 32 is pivotally arranged in the handle groove 11. The handle 31 is arranged on the first pivot shaft 32. The handle 31 has a retracted position and an unlocking position. When the handle 31 is in the retracted position, the handle 31 is located at the opening of the handle groove 11 and does not protrude beyond the surface of the vehicle door 1. When the handle 31 is in the unlocking position, the handle 31 is located in the handle groove 11, and the handle 31 is in contact with the unlocking assembly 2, so as to drive the unlocking assembly 2 to unlock the vehicle door 1 under the action of an external force.

Specifically, when the handle 31 is not in use, the handle 31 is in a retracted position, that is, the handle 31 is in a hidden state, at this time, the handle 31 is flush with the outer sheet metal surface of the vehicle door 1. When the handle 31 needs to be used, the handle 31 is rotated toward the inner side of the vehicle at a certain angle to expose the space of the handle groove 11. By pressing the handle 31, the handle 31 will touch the unlocking assembly 2, thus opening the vehicle door 1 by the unlocking assembly 2. After unlocking is completed, the handle 31 will return from the unlocking position to the retracted position, at which time the handle 31 is flush with the outer sheet metal surface of the vehicle door 1 and returns to the hidden state.

In an embodiment of the present disclosure, the handle 31 will rotate toward the inner side of the vehicle door 1 when in use. The handle 31 will not protrude beyond the surface of the vehicle door 1 even when it is in the unlocking position, so that the handle 31 can be completely hidden. Such a structural design, on the one hand, is conducive to reducing wind resistance and fuel consumption; on the other hand, the handle 31 is integrated with the shape of the vehicle door 1, thereby increasing the texture of the vehicle door assembly 100.

Therefore, by turning the handle 31 inward, it can be ensured that the handle 31 is always in a hidden state, which not only reduces wind resistance, but also avoids the trouble that the outward-extending hidden handle cannot be opened in a freezing environment.

Figure 5:
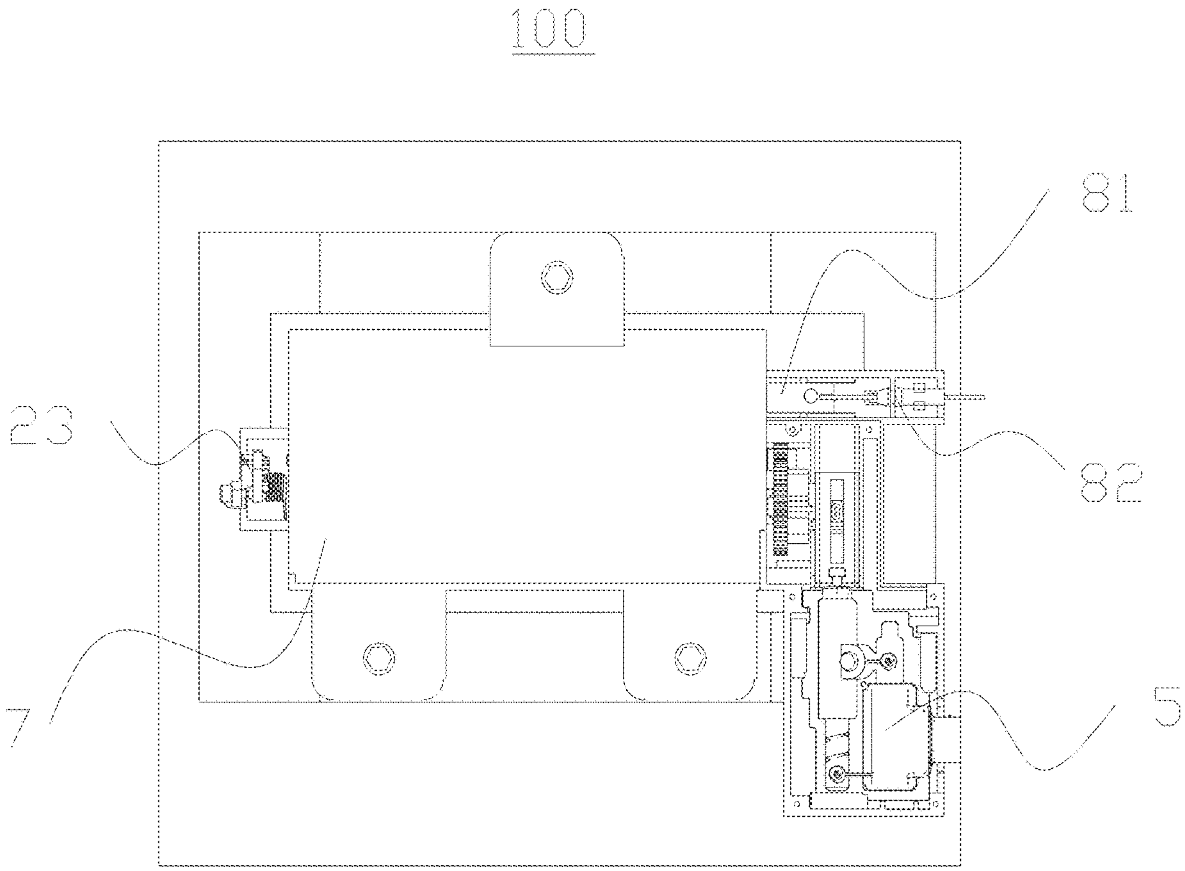
FIG. 5 is a rear view of a vehicle door assembly according to an embodiment of the present disclosure.
Figure 6:
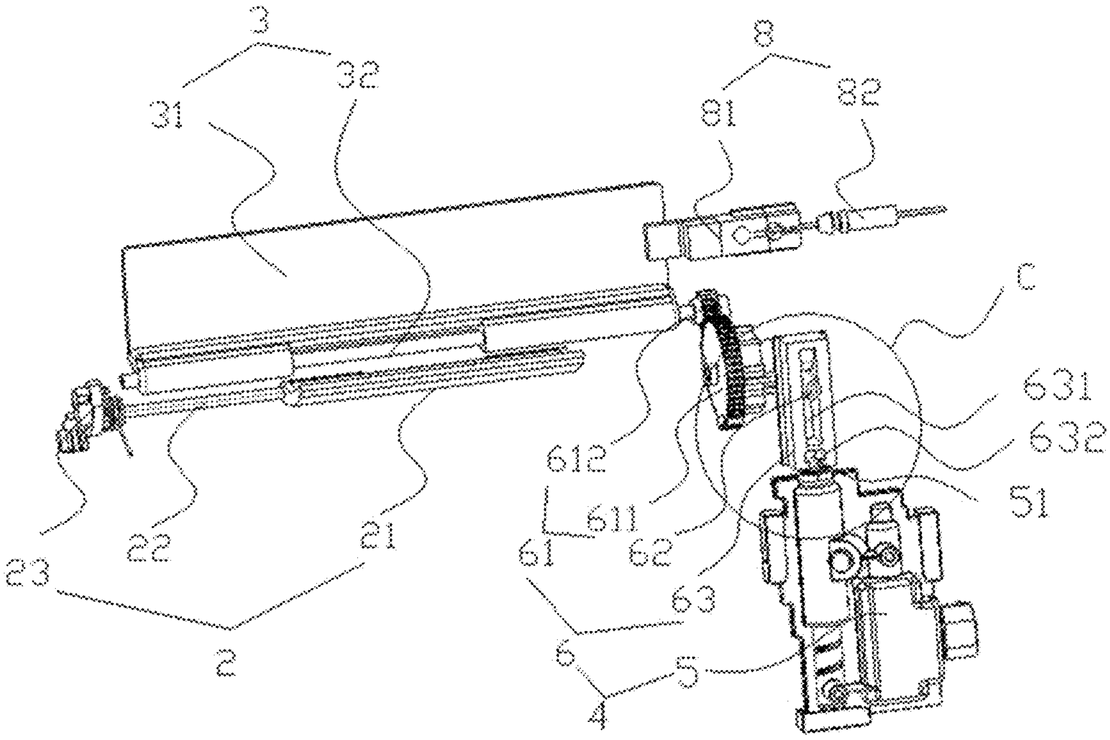
FIG. 6 is a schematic drawing of the handle assembly and the unlocking assembly according to an embodiment of the present disclosure.

Besides, as shown in FIG. 5 and FIG. 6, the vehicle door assembly 100 further includes a power assembly 4, which is in transmission connection with the first pivot shaft 32 to drive the handle 31 to rotate between the retracted position and the unlocking position. Specifically, when the handle 31 is in use, the power assembly 4 automatically rotates the handle 31 from the retracted position to the unlocking position, and then the user presses the handle 31 to drive the unlocking assembly 2 to unlock the vehicle door 1. After unlocking, the power assembly 4 restores the handle 31 from the unlocking state to the retracted position. This arrangement can realize the automatic turning operation of the handle 31, thereby improving user experience, and can also avoid the situation where the spring element pinches the hand and affects the user's operation.

Moreover, as shown in FIG. 6, the power assembly 4 includes a driving member 5 and a transmission device 6, and the transmission device 6 is transmission-connected between the first pivot shaft 32 and the driving member 5. The driving member 5 drives the first pivot shaft 32 to rotate by the transmission device 6, and the first pivot shaft 32 rotates together with the handle 31, so that the handle 31 reciprocates between the retracted position and the unlocking position. Since the rotation angle of the handle 31 is relatively large, if the driving member 5 is directly connected to the first pivot shaft 32, it is easy to cause the stroke of the driving member 5 to be too long, and the stroke space required is relatively large, which is not conducive to the arrangement of the power assembly 4. Therefore, by providing the transmission member 61, it is possible to avoid the driving member 5 being directly connected to the first pivot shaft 32 for transmission, thereby reducing the stroke space occupied by the driving member 5, and facilitating the arrangement of the power assembly 4.

Furthermore, as shown in FIG. 6, the transmission device 6 includes a transmission member 61, a rocker arm 62 and a slider 63. The transmission member 61 is transmission-connected to the first pivot shaft 32, the slider 63 is transmission-connected to the driving member 5, a sliding slot 631 is provided in the slider 63, the rocker arm 62 is connected to the transmission member 61, and one end of the rocker arm 62 is inserted into the sliding slot 631. When the driving member 5 pushes the slider 63 to move back and forth, the inside wall of the sliding slot 631 drives the rocker arm 62 to swing back and forth, and the rocker arm 62 drives the first pivot shaft 32 to rotate by the transmission member 61.

Specifically, according to the contents of the above embodiments, when the handle needs to be used to unlock the vehicle door 1, the driving member 5 will transmit power by the transmission device 6, thereby driving the handle 31 to rotate toward the inner side of the vehicle to the unlocking position, and then the user presses the handle 31 and drives the unlocking assembly 2 to rotate, thereby opening the vehicle door 1 by the unlocking assembly 2. During this process, after the driving member 5 rotates the handle 31 to the unlocking position, the driving member 5 will stop, but the handle 31 needs to continue to move downward under the pressure of the user to press the unlocking assembly 2 to rotate. Therefore, in order to realize the secondary rotation of the handle 31, the transmission device 6 needs to set a clearance space. By providing a sliding slot 631 in the slider 63, and the length of the sliding slot 631 is greater than the rotation circumference of the handle 31 during its second rotation, it is ensured that the handle 31 smoothly drives the unlocking assembly 2 to rotate.

When in use, the telescopic rod of the driving member 5 will extend, driving the slider 63 to move. At this time, the inside wall of the sliding slot 631 close to the driving member 5 will push the rocker arm 62 to rotate forward, and the rocker arm 62 transmits power to the first pivot shaft 32 by the transmission member 61, thereby driving the handle 31 to rotate to the unlocking position. Subsequently, when the user needs to unlock the vehicle door 1, press the handle 31 hard, thereby driving the unlocking assembly 2 to rotate.

At this time, the first pivot shaft 32 will transmit the effect of this force to the transmission member 61, thereby causing the rocker arm 62 to continue to rotate forward, that is, the rocker arm 62 rotates alone to the side away from the driving member 5.

Through the cooperation between the rocker arm 62 and the slider 63, the segmented motion characteristics of the handle 31 can be effectively realized, which not only has a simple structure and low functional cost, but is also stable and not easy to be damaged, thereby improving the reliability of the transmission device 6.

Figure 4:
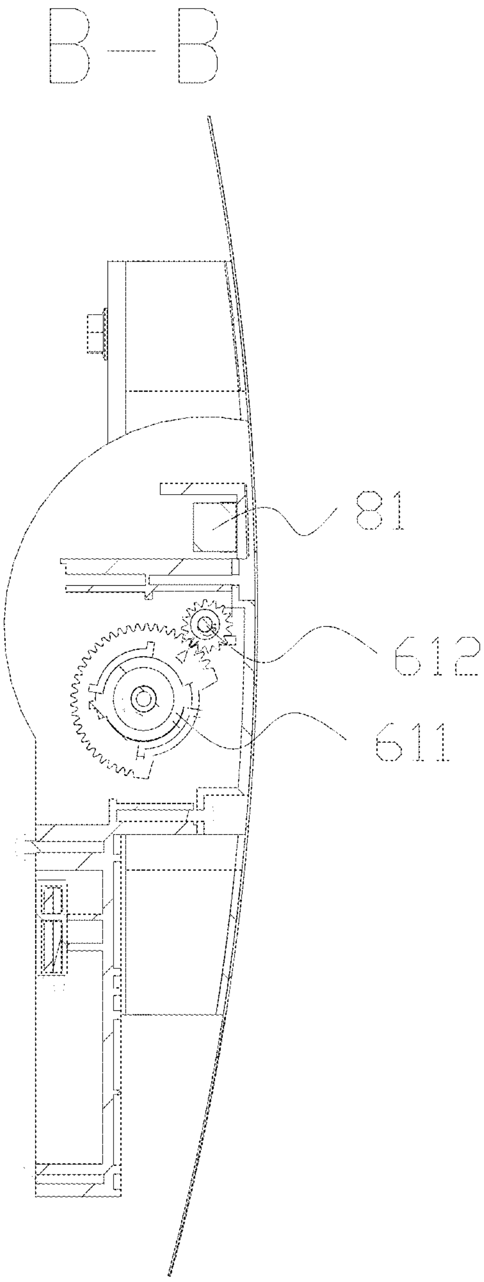
FIG. 4 is a cross-sectional view along line B-B in FIG. 2.

In an embodiment of the present disclosure, as shown in FIG. 4 and FIG. 6, there are at least two transmission members 61, and the at least two transmission members 61 include a driving gear 611 and a driven gear 612. The diameter of the driving gear 611 is greater than the diameter of the driven gear 612. The driving gear 611 and the driven gear 612 are meshed for transmission. The driving gear 611 is arranged on the rocker arm 62, and the driven gear 612 is arranged on the first pivot shaft 32.

Specifically, by setting up a gear transmission, the direction of power transmission of the driving member 5 can be realized, so that the rotation direction of the handle 31 is opposite to the moving direction of the slider 63 driven by the driving member 5, which facilitates the handle 31 moving in the second stage to drive the unlocking swing arm 21 to unlock the vehicle door 1. At the same time, by setting the driving gear 611 larger than the driven gear 612, the moving distance of the slider 63 can be enlarged, thereby reducing the transmission space occupied by the transmission device 6, and more other components can be placed in the limited space of the vehicle door 1.

Figure 7:
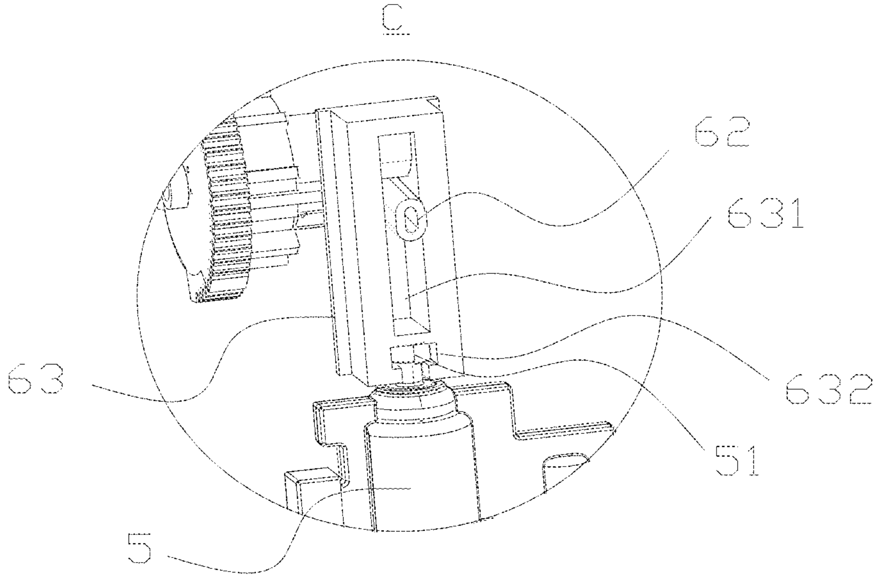
FIG. 7 is an enlarged view of the circled portion C in FIG. 6.

In an embodiment of the present disclosure, as shown in FIG. 6 and FIG. 7, the slider 63 further includes a mounting groove 632, and the driving member 5 is provided with a limiting plate 51, and the limiting plate 51 is embedded in the mounting groove 632. Specifically, since the slider 63 is a wearing part and is prone to wear and tear between the rocker arm 62 after long-term use, a split connection is adopted between the slider 63 and the telescopic rod of the driving member 5, which can facilitate independent replacement of the slider 63 and reduce the cost of use.

In an embodiment of the present disclosure, as shown in FIG. 6, the unlocking assembly 2 also includes an unlocking swing arm 21, a second pivot shaft 22 and an unlocking fastener 23, wherein the second pivot shaft 22 is respectively transmission-connected to the unlocking swing arm 21 and the unlocking fastener 23, and the unlocking swing arm 21 rotates around the second pivot shaft 22 under the action of the handle 31 and drives the unlocking fastener 23 to rotate to unlock the vehicle door 1.

Specifically, when the first pivot shaft 32 is arranged under the handle groove 11, the second pivot shaft 22 is arranged on one side of the first pivot shaft 32. At this time, the unlocking swing arm 21 is arranged under the unlocking position and is in close contact with the handle 31, so that it is convenient for the user to press the handle 31 to drive the unlocking swing arm 21 to rotate. The unlocking fastener 23 also rotates under the drive of the second pivot shaft 22, so that the lock core of the vehicle door 1 can be disengaged from the door bolt, thereby unlocking the vehicle door 1. Through such a setting, it is easy to achieve the linkage between the unlocking swing arm 21 and the handle 31, avoiding the user's direct manual contact with the unlocking swing arm 21, which is beneficial to the arrangement of the handle assembly 3 and the unlocking assembly 2.

In addition, as shown in FIG. 3, the vehicle door assembly 100 further includes a shell 7 and a fixing plate 71, the handle groove 11 is formed between the shell 7 and the vehicle door 1, the fixing plate 71 is connected to the shell 7, and the first pivot shaft 32 and the second pivot shaft 22 are both connected to the fixing plate 71.

Specifically, the shell 7 is arranged in the vehicle door 1, and the periphery of the shell 7 is connected to the inside wall of the vehicle door 1. The setting of the shell 7 can protect the rotation of the handle 31 and the unlocking swing arm 21 in the handle groove 11, thereby preventing other components in the vehicle door 1 from interfering with the rotation of the handle 31 and the unlocking swing arm 21 which affects the normal unlocking function of the vehicle door 1. At the same time, the shell 7 can also serve as a fixing seat, that is, the fixing plate 71 is arranged on the shell 7, so as to facilitate the first pivot shaft 32 and the second pivot shaft 22 to be assembled on the fixing plate 71, thereby simplifying the assembly structure and improving the integration of the vehicle door assembly 100.

Figure 8:
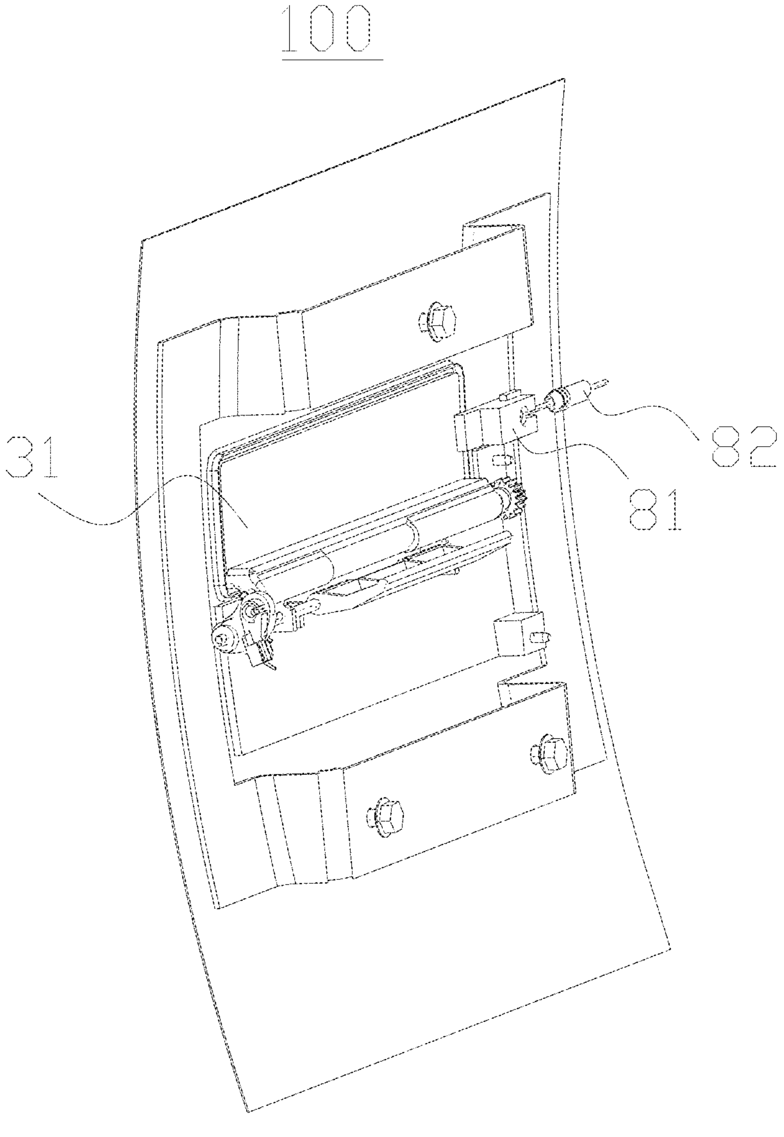
FIG. 8 is an assembly drawing of the locking assembly and the handle according to an embodiment of the present disclosure.

In an embodiment of the present disclosure, as shown in FIG. 5 and FIG. 8, the vehicle door assembly 100 further includes a locking assembly 8, the locking assembly 8 includes a locking block 81 and a puller 82, and the locking block 81 is connected to the puller 82. When the handle 31 is in the retracted position, the locking block 81 extends to the back of the handle 31 to lock the rotation of the handle 31. Specifically, when the vehicle door 1 is in a closed state, the rotation of the handle 31 is locked by the locking block 81, thereby playing an anti-theft role and preventing external force from violently pushing the handle 31 to rotate inward to open the vehicle door 1.

The vehicle according to the embodiment of the present disclosure includes the vehicle door assembly 100 of the above embodiment. Specifically, a vehicle using the above-mentioned vehicle door assembly 100 can improve the overall texture and operating comfort, which is conducive to improving the market competitiveness of the vehicle.

In the description of this specification, the description of the reference terms "an embodiment", "some embodiments", "an example", "a specific example", "some examples", and the like means that specific features, structures, materials or characteristics described in combination with the embodiment(s) or example(s) are included in at least one embodiment or example of the present disclosure. In this specification, exemplary descriptions of the foregoing terms do not necessarily refer to the same embodiment or example. In addition, the described specific features, structures, materials, or characteristics may be combined in a proper manner in any one or more of the embodiments or examples.

Although the embodiments of the present disclosure have been shown and described above, it can be understood that, the foregoing embodiments are exemplary and should not be understood as limitation to the present disclosure. A person of ordinary skill in the art can make changes, modifications, replacements, or variations to the foregoing embodiments within the scope of the present disclosure.

What is claimed is:

1. A vehicle door assembly, comprising:

a vehicle door, the vehicle door being provided with a handle groove;

an unlocking assembly, the unlocking assembly being arranged in the vehicle door and configured to unlock the vehicle door; and a handle assembly, the handle assembly being arranged in the handle groove, the handle assembly including a handle and a first pivot shaft, the first pivot shaft being pivotally arranged in the handle groove, the handle being arranged on the first pivot shaft, and the handle having a retracted position and an unlocking position;

wherein, when the handle is in the retracted position, the handle is located at the opening of the handle groove and does not protrude beyond the surface of the vehicle door; when the handle is in the unlocking position, the handle is located in the handle groove, and the handle is in contact with the unlocking assembly so as to drive the unlocking assembly to unlock the vehicle door under the action of an external force, the vehicle door assembly further comprising:

a locking assembly, the locking assembly comprising a locking block and a puller, the locking block being connected to the puller, wherein when the handle is in the retracted position, the locking block extending to the back of the handle to lock the rotation of the handle.

2. The vehicle door assembly according to claim 1, wherein the vehicle door assembly further comprises:

a power assembly, the power assembly being in transmission connection with the first pivot shaft and driving the first pivot shaft to rotate to drive the handle to rotate between the retracted position and the unlocking position.

3. The vehicle door assembly according to claim 2, wherein, the unlocking assembly comprises an unlocking swing arm, a second pivot shaft and an unlocking fastener, the second pivot shaft is respectively transmission-connected to the unlocking swing arm and the unlocking fastener, and the unlocking swing arm rotates around the second pivot shaft under the action of the handle and drives the unlocking fastener to rotate to unlock the vehicle door.

4. A vehicle, including: a vehicle door assembly according to claim 2.

5. The vehicle door assembly according to claim 2, wherein the power assembly comprises a driving member and a transmission device, and the transmission device is transmission-connected between the first pivot shaft and the driving member.

6. The vehicle door assembly according to claim 5, wherein the transmission device comprises a transmission member, a rocker arm, and a slider, the transmission member is transmission-connected to the first pivot shaft, the slider is transmission-connected to the driving member, a sliding slot is provided in the slider, the rocker arm is connected to the transmission member, and one end of the rocker arm is inserted into the sliding slot, wherein, when the driving member pushes the slider to move back and forth, the inside wall of the sliding slot drives the rocker arm to swing back and forth, and the rocker arm drives the first pivot shaft to rotate by the transmission member.

7. The vehicle door assembly according to claim 6, wherein at least two transmission members are comprised, and the at least two transmission members include a driving gear and a driven gear, the diameter of the driving gear is larger than the diameter of the driven gear, the driving gear and the driven gear are meshed for transmission, the driving gear is arranged on the rocker arm, and the driven gear is arranged on the first pivot shaft.

8. The vehicle door assembly according to claim 6, wherein, the slider is further provided with a mounting groove, and the driving member is provided with a limiting plate, and the limiting plate is embedded in the mounting groove.

9. A vehicle door assembly, comprising:

a vehicle door, the vehicle door being provided with a handle groove;

an unlocking assembly, the unlocking assembly being arranged in the vehicle door and configured to unlock the vehicle door; and a handle assembly, the handle assembly being arranged in the handle groove, the handle assembly including a handle and a first pivot shaft, the first pivot shaft being pivotally arranged in the handle groove, the handle being arranged on the first pivot shaft, and the handle having a retracted position and an unlocking position;

wherein, when the handle is in the retracted position, the handle is located at the opening of the handle groove and does not protrude beyond the surface of the vehicle door; when the handle is in the unlocking position, the handle is located in the handle groove, and the handle is in contact with the unlocking assembly so as to drive the unlocking assembly to unlock the vehicle door under the action of an external force;

wherein, the unlocking assembly comprises an unlocking swing arm, a second pivot shaft and an unlocking fastener, the second pivot shaft is respectively transmission-connected to the unlocking swing arm and the unlocking fastener, and the unlocking swing arm rotates around the second pivot shaft under the action of the handle and drives the unlocking fastener to rotate to unlock the vehicle door, and the vehicle door assembly further comprising a shell and a fixing plate, the handle groove being formed between the shell and the vehicle door, the fixing plate being connected to the shell, and the first pivot shaft being connected to the fixing plate.

* * * * *